(12) United States Patent
Jeon et al.

(10) Patent No.: US 9,623,801 B2
(45) Date of Patent: Apr. 18, 2017

(54) INTEGRATED INSIDE MIRROR ASSEMBLY OF VEHICLE

(71) Applicant: Hyundai Motor Company, Seoul (KR)

(72) Inventors: Hyun Min Jeon, Hwaseong-si (KR); Woo Youn Geum, Suwon-si (KR); Byung Seob Yu, Osan-si (KR); Sae Hyun Park, Daegu (KR); Keun Sig Lim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 14/570,055

(22) Filed: Dec. 15, 2014

(65) Prior Publication Data

US 2016/0016518 A1 Jan. 21, 2016

(30) Foreign Application Priority Data

Jul. 17, 2014 (KR) .................. 10-2014-0090268

(51) Int. Cl.
*B60R 1/04* (2006.01)
*B60R 1/12* (2006.01)

(52) U.S. Cl.
CPC .............. *B60R 1/12* (2013.01); *B60R 1/04* (2013.01); *B60R 2001/1223* (2013.01); *B60R 2001/1261* (2013.01)

(58) Field of Classification Search
CPC .............. B60R 1/04; B60R 2001/1223; B60R 2001/1261; G02B 7/182
USPC .................................. 359/871, 872; 248/549
See application file for complete search history.

(56) References Cited

U.S. PATENT DOCUMENTS

| | | | |
|---|---|---|---|
| 6,516,664 B2* | 2/2003 | Lynam | B60R 1/04 73/170.17 |
| 8,256,821 B2* | 9/2012 | Lawlor | B60R 1/12 296/37.8 |
| 8,925,891 B2* | 1/2015 | Van Huis | B60R 11/04 248/475.1 |
| 2004/0196179 A1* | 10/2004 | Turnbull | G01S 5/0221 342/357.75 |
| 2004/0232773 A1* | 11/2004 | Parker | B60R 1/04 307/10.1 |
| 2007/0297075 A1* | 12/2007 | Schofield | B60R 1/04 359/872 |

(Continued)

FOREIGN PATENT DOCUMENTS

| | | |
|---|---|---|
| JP | 2005-119561 A | 5/2005 |
| KR | 2002-0044026 A | 6/2002 |

(Continued)

*Primary Examiner* — Ricky D Shafer
(74) *Attorney, Agent, or Firm* — Morgan, Lewis & Bockius LLP (57) ABSTRACT

An integrated inside mirror assembly for a vehicle may have a stay fixed to a windshield glass of the vehicle and an inside mirror coupled to the stay, in which the stay may include a sub stay coupled to a rear surface of the inside mirror, a base attached to an upper end of the windshield glass and to which a rain sensor is mounted, a mount slidably assembled at an outside of the base and coupled to the sub stay through a ball joint, a stay cover coupled to the mount while surrounding the mount and attached to the upper end of the windshield glass, and an antenna cover assembled at one side of the mount and to which an antenna member is mounted.

12 Claims, 11 Drawing Sheets

(56) References Cited

U.S. PATENT DOCUMENTS

| | | | | |
|---|---|---|---|---|
| 2008/0315060 A1* | 12/2008 | Muller | ............... | B60R 1/04 |
| | | | | 248/475.1 |
| 2010/0090086 A1* | 4/2010 | Zinser | ............... | B60R 1/10 |
| | | | | 248/476 |
| 2010/0277821 A1* | 11/2010 | Roth | ............... | B60R 1/04 |
| | | | | 359/872 |
| 2014/0055617 A1* | 2/2014 | Minikey, Jr. | ............... | B60R 1/04 |
| | | | | 348/148 |
| 2014/0091123 A1* | 4/2014 | Kim | ............... | B60R 1/04 |
| | | | | 224/567 |

FOREIGN PATENT DOCUMENTS

| | | |
|---|---|---|
| KR | 10-0871233 B1 | 11/2008 |
| KR | 10-2010-0123434 A | 11/2010 |
| KR | 20-2012-0003072 U | 5/2012 |
| KR | 10-1282077 B1 | 7/2013 |
| WO | WO 2006/063827 A1 | 6/2006 |
| WO | WO 2014/052658 A1 | 4/2014 |

\* cited by examiner

[ SECTION A-A ]

FIG. 7D

[ SECTION B-B ]

INTEGRATED INSIDE MIRROR ASSEMBLY OF VEHICLE

CROSS-REFERENCE TO RELATED APPLICATION

The present application priority to Korean Patent Application No. 10-2014-0090268 filed Jul. 17, 2014, the entire contents of which is incorporated herein for all purposes by this reference.

BACKGROUND OF THE INVENTION

Field of the Invention

The present invention relates to an integrated inside mirror assembly of a vehicle, and more particularly to an integrated inside mirror assembly of a vehicle for improving a layout by integrally configuring various components attached to windshield glass on a front side of the vehicle.

Description of Related Art

In recent years, a rain sensor for detecting an amount of rain dropping on windshield glass and automatically adjusting an operation of a wiper are installed in luxury vehicles. Generally, the rain sensor installed in the windshield glass may be a rain sensor including a light emitting unit and a light receiving element, and transmits light emitted from the light emitting unit through the light receiving element, detects an amount of rain according to an amount of the transmitted light, and converts the detected amount of light into a voltage difference to control an operation of the wiper.

In addition to the rain sensor, various electronic devices for convenience of a user, such as a camera, a defog sensor, an electronic toll collection system (ETCS) antenna, are mounted to the interior of a vehicle, and the annexed electronic devices are generally disposed at an end of the windshield glass and their components are fixed to a separate bracket.

Then, in order to improve a deterioration of a layout due to the annexed electronic devices, some electronic devices are embedded or integrated in an inside mirror installed at an upper end of the windshield glass to improve the layout according to the related art, but the integrated inside mirror according to the related art causes an interference in a view of field of a driver as the size of a stay cover in which various electronic devices are embedded increases and an assembly efficiency and a work efficiency of the vehicle are lowered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an integrated inside mirror assembly of a vehicle which can improve layout and enhance assembly efficiency and work efficiency by integrally configuring a rain sensor, an ETCS antenna, and a defog sensor in a stay of an inside mirror.

According to various aspects of the present invention, an integrated inside mirror assembly for a vehicle may have a stay fixed to windshield glass of the vehicle and an inside mirror coupled to the stay, in which the stay may include a sub stay coupled to a rear surface of the inside mirror, a base attached to an upper end of the windshield glass and to which a rain sensor is mounted, a mount slidably assembled at an outside of the base and coupled to the sub stay through a ball joint, a stay cover coupled to the mount while surrounding the mount and attached to the upper end of the windshield glass, and an antenna cover assembled at one side of the mount and to which an antenna member is mounted.

The base may include a sensor hole into which the rain sensor is inserted, and a side coupling boss may protrude from a side surface for coupling of a spring clip supporting the rain sensor inserted into the sensor hole.

Mount guides corresponding to inclined surfaces may be provided on opposite side surfaces of a tip end of the base to prevent separation of the slidably assembled mount, and base guides having inclined surfaces corresponding to the mount guides may be formed in the mount.

Second position guides may protrude outwards from opposite side surfaces of a rear end of the base, for setting of an assembly position of the mount, and the second position guides may stop while contacting ends of guide rails formed at a rear end of the mount to determine a sliding assembly position of the mount.

First position guides may vertically protrude from a lower surface of a tip end of the base, for setting of an assembly position of the mount, and the first position guides may form a predetermined distance between an upper surface of the mount and a lower surface of the base.

A first coupling hole may be formed at one end of the base, for bolt coupling of the base to the mount, and the mount may have a second hole overlapping the first coupling hole.

A plurality of holders may be formed on opposite side surfaces of the mount, for coupling to the stay cover, the stay cover may have a first cover at one of left and right sides thereof and a second cover at the other of the left and right sides thereof such that a plurality of coupling parts inserted into the holders protrude from an inside of the stay cover.

The mount may have a connector bracket on one of left and right side surfaces thereof, and a connector for electrical connection of the inside mirror may be assembled in the connector bracket.

The mount may include a first wire support for supporting an electric wire of the inside mirror and a second wire support for supporting a signal wire of the antenna member on a lower surface thereof.

The antenna member may be an electronic toll collection system (ETCS) antenna for an ETCS.

The stay cover may include a first cover at one of left and right sides thereof and a second cover at the other of the left and right sides thereof, which are coupled to each other, in which a joint through-hole through which the ball joint of the mount passes may be formed at a portion of the stay cover where the first cover and the second cover are jointed to each other, and a wiring hole through which the electric wire of the inside mirror and the signal wire of the antenna member passes may be formed on a rear side of the joint through-hole.

A seam prevention pad to which the windshield glass is adhered may be attached to a periphery of the stay cover.

The rain sensor may be a defog sensor embedded rain sensor having a defog sensor at one side thereof, and the stay cover may have an air circulation hole for introducing and discharging air for an operation of the defog sensor The integrated inside mirror assembly of a vehicle according to the present invention can improve a layout of an upper end of windshield glass and enhance assembly efficiency and work efficiency when the vehicle is manufactured as compared with the related art.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to an integrated inside mirror assembly installed in wind shield glass of a vehicle, and particularly improves a layout of an upper end of windshield glass and enhances assembly efficiency and work efficiency by integrally configuring electronic components such as a rain sensor, an ETCS antenna, and a defog sensor in a stay coupled to a rear surface of an inside mirror.

As shown in FIG. 1A, FIG. 1B, FIG. 2A, FIG. 2B and FIG. 2C, an inside mirror assembly according to various embodiments of the present invention largely includes a stay 100 fixed to windshield glass of a vehicle and an inside mirror 200 coupled to the stay 100, and the stay 100 includes a sub stay 110 coupled to a rear surface of the inside mirror 200, a base 120, a mount 130, a stay cover 140, and an antenna cover 150.

The base 120 is a component attached to an upper end of the windshield glass and attached to the windshield glass through a bonding unit such as a bonding tape, and as shown in FIG. 3A, FIG. 3B, FIG. 3C and FIG. 3D, an upper surface of the base 120 to which the bonding unit is attached is flat, in which case the bonding unit is attached to an outer side of a sensor hole 121 with respect to a guide rib 123 formed at a periphery of the sensor hole 121.

The base 120 is provided with the sensor hole 121 into which a rain sensor 160 is inserted for coupling of the rain sensor 160, and a spring clip 165 is used to fixedly support the rain sensor 160 inserted into the sensor hole 121.

As can be seen in FIG. 3A, FIG. 3B, FIG. 3C, FIG. 3D, FIG. 4A and FIG. 4B, the spring clip 165 includes a clip body 166 supporting the rain sensor 160 on a lower surface of the base 120 and a clip arm 167 latched and fixed by a side coupling boss 125 protruding on a side surface of the base 120, and the clip arm 167 is resiliently latched and fixed by the side coupling boss 125 to support a lower surface of the rain sensor 160 inserted into the sensor hole 121.

The base 120 includes a mount base 127 of which opposite sides of a tip end are inclined surfaces, and the width of the base 120 becomes gradually larger as it goes from an upper surface to a lower surface thereof due to the mount guide 127.

Figure 5A:
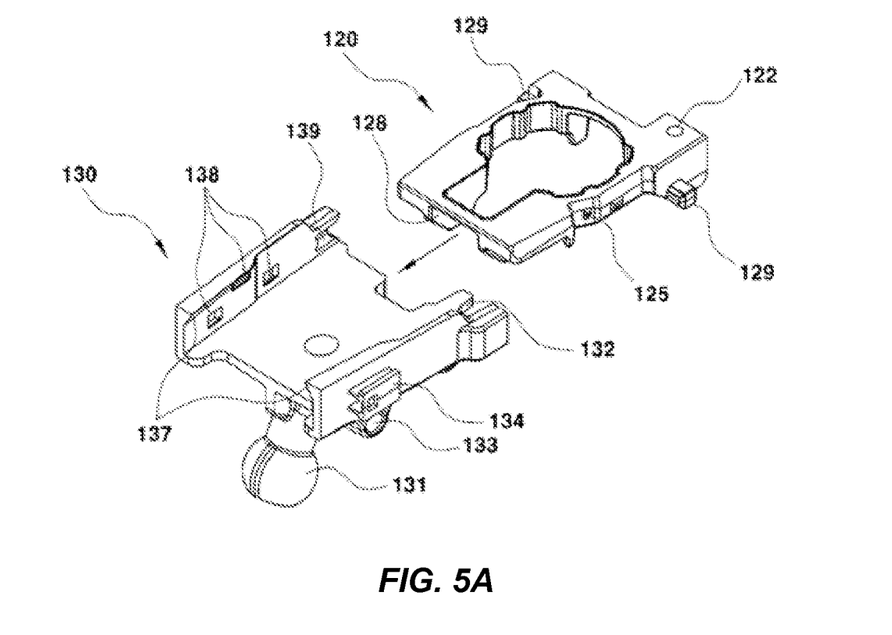
FIG. 5A, FIG. 5B, ad FIG. 5C are views showing an assembled state of the base and a mount of the exemplary integrated inside mirror assembly according to the present invention.
Figure 5B:
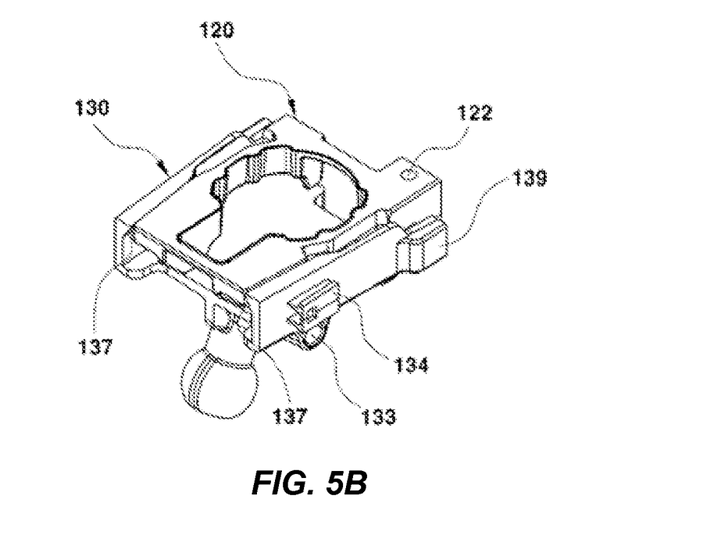
Figure 5C:
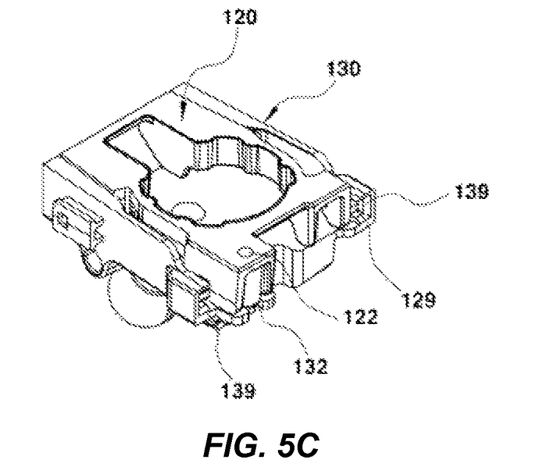

As can be seen in FIG. 5A, FIG. 5B, ad FIG. 5C, a base guide 137 having an inclined surface corresponding to the mount guide 127 is formed in the mount 130, and the width of the base guide 137 becomes gradually smaller as it goes from an upper side to a lower side of a side surface of the mount 130.

Accordingly, when the mount 130 is slidably coupled to the base 120, it is fixed while not being slid and separated from the base 120 upwards and downwards, whereby assembly efficiency can be secured.

First position guides 128 for setting an assembly position of the mount 130 are provided on a lower surface of a tip end of the base 120. The first position guides 128 vertically protrude from a lower surface of the tip end of the base 120 such that a predetermined distance (height) is formed between a lower surface of the mount 130 on which an upper surface (ball joint 131) of the mount 130 is formed and a lower surface of the base 120, whereby a mounting position of the mount 130 is set to upper and lower sides of the upper and lower surfaces of the base 120.

Second position guide 129 for setting an assembly position of the mount 130 are provided at a rear end of the base 120. The second position guides 129 protrude outwards from opposite side surface of the rear end of the base 120 to set a mounting position (insertion position) of the mount 130 with respect to a sliding direction (forward/rearward direction) of the mount 130 slidably assembled in the base 120 (that is, to determine the sliding assembly position of the mount 130).

Then, the second position guides 129 reaches ends of guide rails 139 and stop after sliding along the guide rails 139 of the mount 130.

The positions of the mount 130 and the stay cover 140 coupled to the mount 130 may be determined by the first band second position guides 128 and 129 when the mount 130 is slidably assembled in the base 120 attached to the windshield glass.

A first coupling hole 122 is formed at a rear end of the base 120 to be coupled to the mount 130 for bolt coupling. The base 120 is bolted to the mount 130 through the first coupling hole 122 without coming off from each other to prevent shaking of an inside mirror 200.

Although not shown, the position of the first coupling hole 122 may be changed, and for example, may be provided at one side of an upper end of the base 120.

Figure 6:
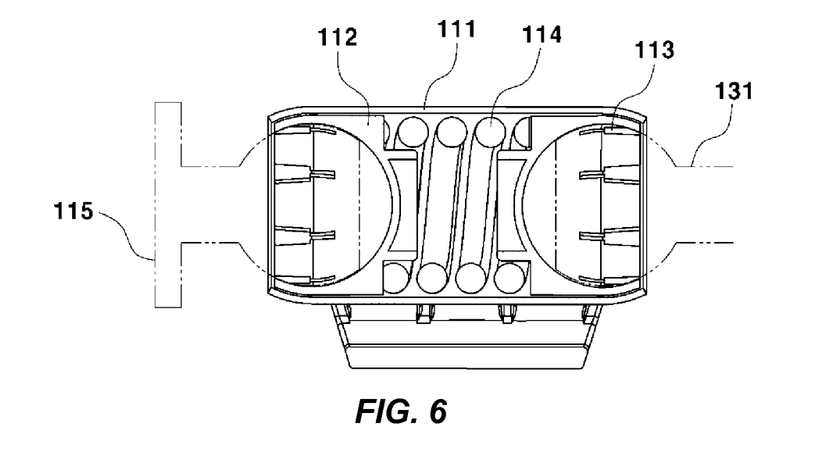
FIG. 6 is a view showing a sub stay of the exemplary integrated inside mirror assembly according to the present invention.
Figure 7A:
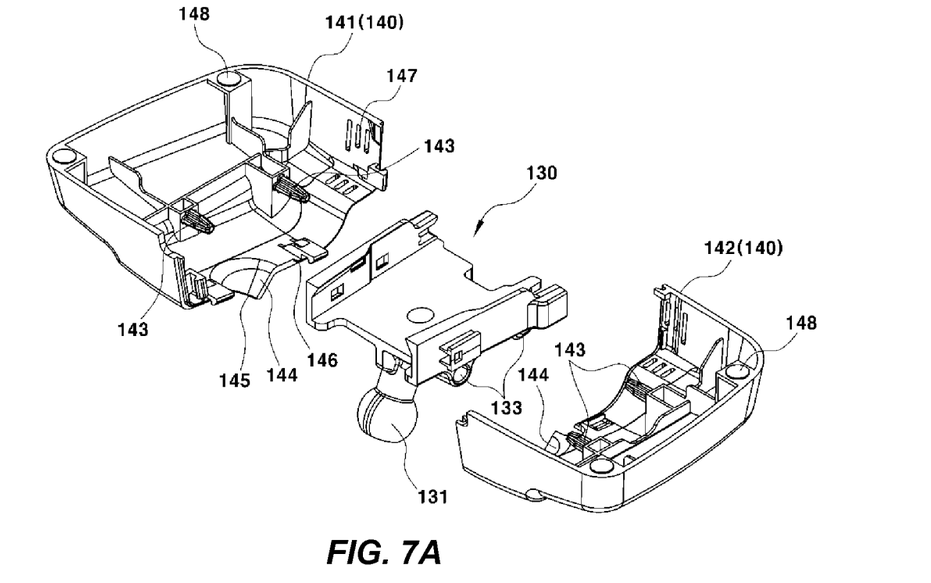
FIG. 7A, FIG. 7B and FIG. 7C are views showing an assembled state of the base and a stay cover of the exemplary integrated inside mirror assembly according to the present invention.
Figure 7B:
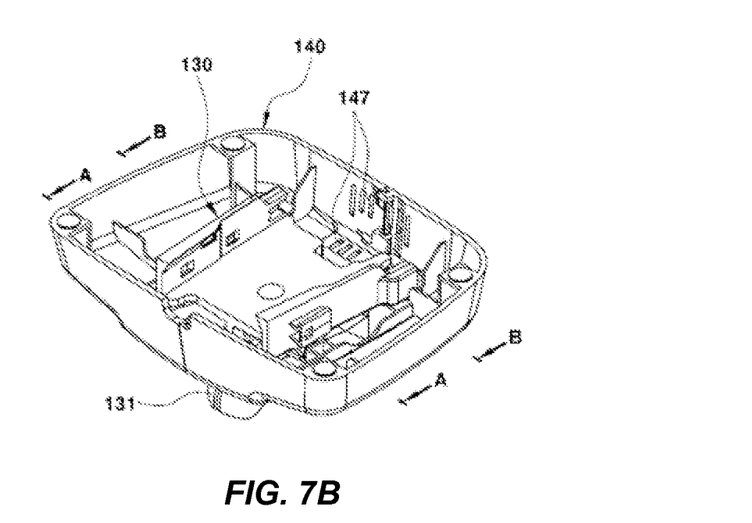
Figure 7C:
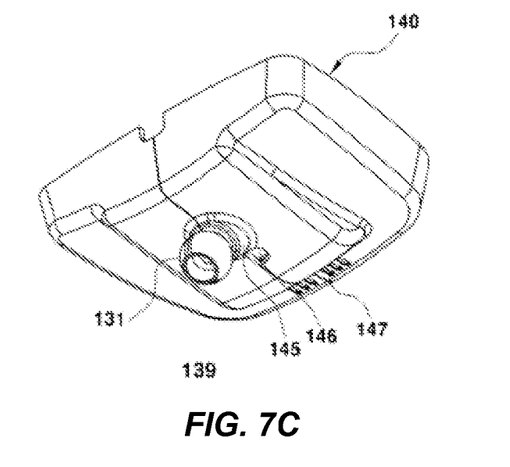
Figure 7D:
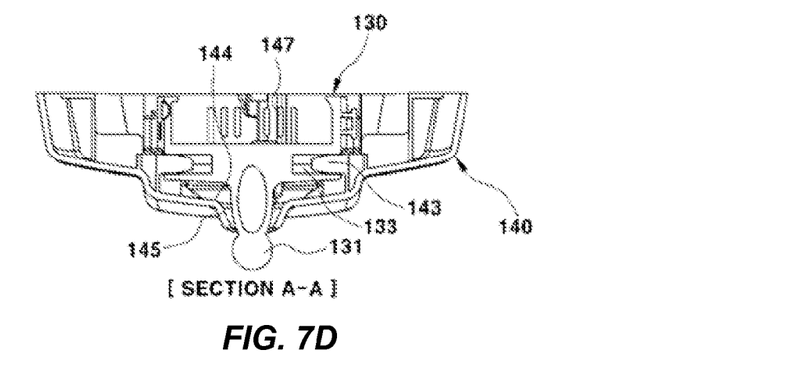
FIG. 7D and FIG. 7E shows sectional views taken along line A-A and B-B of FIG. 7B.
Figure 7E:
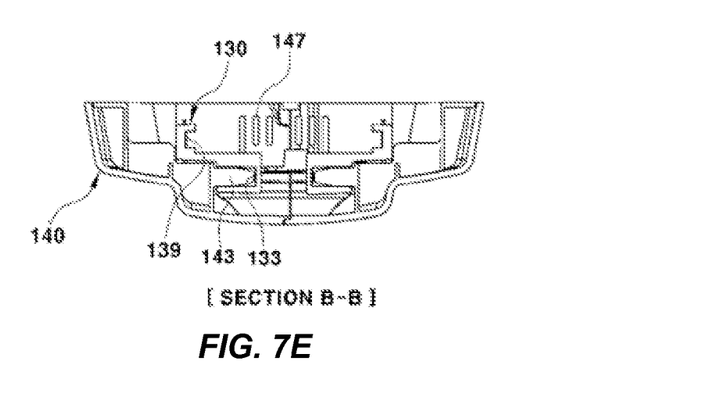

As can be seen in FIG. 6, the mount 130 is coupled to the sub stay 110 through a ball joint 131 provided on a lower surface thereof, and is assembled in the base 120 in a sliding fashion.

As can be seen in FIG. 5A, FIG. 5B, FIG. 5C, FIG. 7A, FIG. 7B and FIG. 7C, a second coupling hole 132 overlapping the first coupling hole 122 is formed at a rear end of the mount 130 in consideration of the position of the first coupling hole 122 of the base 120. The mount 130 is bolted to the base 120 without coming off through the second coupling hole 132 to prevent shaking of the inside mirror 200.

Although not shown, the position of the second coupling hole 132 also may be changed, and for example, may be provided at one side of a tip end of the mount 130.

As can be seen in FIG. 7A, FIG. 7B and FIG. 7C, FIG. 7D and FIG. 7E, a plurality of holders 133 are formed on opposite side surfaces of the mount 130 to couple and fix the stay cover 140 to the mount 130, and coupling parts 143 of the stay cover 140 are inserted into and fixed to the holders 133.

Figure 8A:
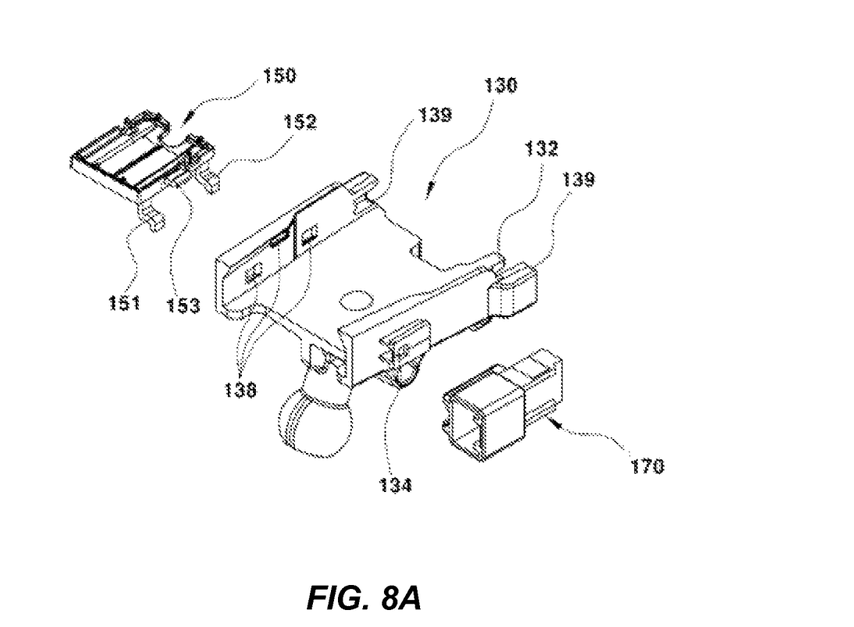
FIG. 8A and FIG. 8B are views showing an assembled state of the mount, an antenna cover, and a mirror connector of the exemplary integrated inside mirror assembly according to the present invention.
Figure 8B:
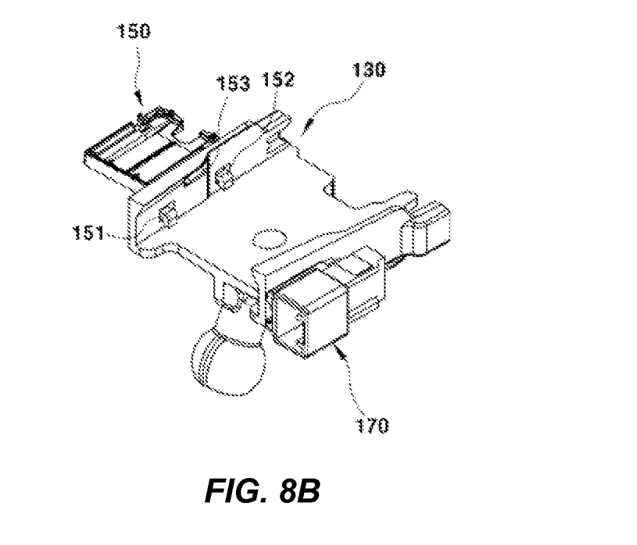

As can be seen in FIG. 8A and FIG. 8B, connector brackets 134 are provided on left and right side surfaces of the mount 130 to fix a mirror connector for electrical connection of the inside mirror 200, and the mirror connector 170 is simply assembled in the connector bracket 134 in a sliding fashion.

Figure 9:
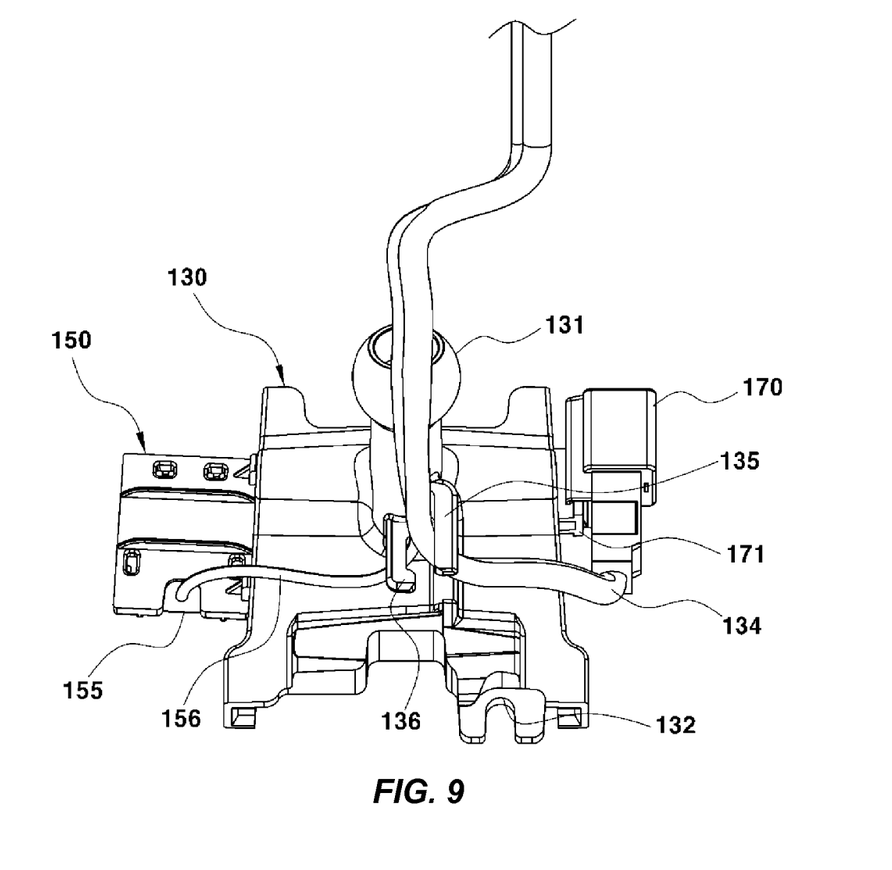
FIG. 9 is a view showing an assembled state and a wire support structure of the mount, the antenna cover, and the mirror connector of the exemplary integrated inside mirror assembly according to the present invention.

As can be seen in FIG. 9, a first wire support 135 for supporting and fixing an electric wire 171 of the inside mirror 200 connected to the mirror connector 170, and a second wire support 136 for supporting and fixing a signal wire 156 of an antenna member 155 connected to the inside mirror 200 for transmission of signals are provided on a lower surface of the mount 130.

The first and second wire supports 135 and 136 may protrude from one side to a rear side of the ball joint 131.

The rain sensor 160 is provided with electrical connection through a sensor connector 161 integrally provided at one of upper and lower sides of the resin sensor 160.

The rain sensor 160 mounted to the base 120 may employ a defog sensor 163 at one of upper and lower sides thereof or may be an integrally formed rain sensor provided at one side of the rain sensor 160. That is, the rain sensor 160 may be a defog sensor embedded rain sensor provided with a defog sensor 163 or may be a rain sensor which does not employ a defog sensor. Then, the defog sensor 163 may be provided with electrical connection through the sensor connector 161 of the rain sensor 160.

As can be seen in FIG. 8A and FIG. 8B, assembly holes 138 for coupling of the antenna cover 150 are formed on left and right opposite surfaces (an opposite side of one side surface of the mount 130 on which the connector bracket 134 is formed) of the mount 130. Then, the assembly holes 138 are a plurality of holes, and for example, the holes are disposed in a triangular shape such that a first leg 151 and a second leg 152 of the antenna cover 150 are inserted into two holes disposed on a lower side thereof and a third leg 153 is inserted into and latched and fixed to one hole disposed on an upper side thereof.

That is, the antenna cover 150 is fixed to a hole of the mount 130 by the third leg 153, and is stably supported by the first and second legs 151 and 152.

The antenna cover 150 has a structure for stably holding and assembling the antenna member 155 on an upper surface thereof, and the antenna member 155 is an electronic toll collection system (ETCS) antenna for an ETCS.

As can be seen in FIG. 9, the stay cover 140 includes a first cover 141 at one of left and right sides thereof and a second cover 142 at the other of the left and right sides thereof, which are coupled to each other, and is coupled to the mount 130 through a plurality of coupling parts 143 protruding from insides of the first and second covers 141 and 142.

The stay cover 140 is mounted to the mount 130 to surround various components assembled in the mount 130 and the base 120, and then the ball joint 131 of the mount 130 passes through the stay cover 140.

As can be seen in FIG. 7A, FIG. 7B and FIG. 7C, FIG. 7D and FIG. 7E, a joint through-hole 144 is formed at a portion of the stay cover 140 where the first cover 141 and the second cover 142 are jointed to each other, and a wiring hole 146 through which an electric wire 171 of the inside mirror 200 and a signal wire 156 of the antenna member 155 is formed on a rear side of the joint through-hole 144.

A joint neck 145 integrally connected to the joint through-hole 144 protrudes from a rear surface of the stay cover 140 such that the stay cover 140 is coupled to the mount 130 while surrounding one side of the ball joint 131 and enclosing the mount 130 and the base 120 through the joint neck 145.

Air circulation holes 147 corresponding to a plurality of holes for introducing and discharging air is provided at a rear end of the stay cover 140, for a smooth operation of the defog sensor 163 mounted to the base 120. The air circulation holes 147 is close to the defog sensor 163 or is provided at a position facing the defog sensor 163.

A seam prevention pad 148 is attached to a periphery of the stay cover 140, for example, a corner portion of a periphery of the stay cover 140.

The seam prevention pad 148 is attached to the windshield glass to function to prevent generation of a seam between the stay cover 140 and the windshield glass.

Figure 1A:
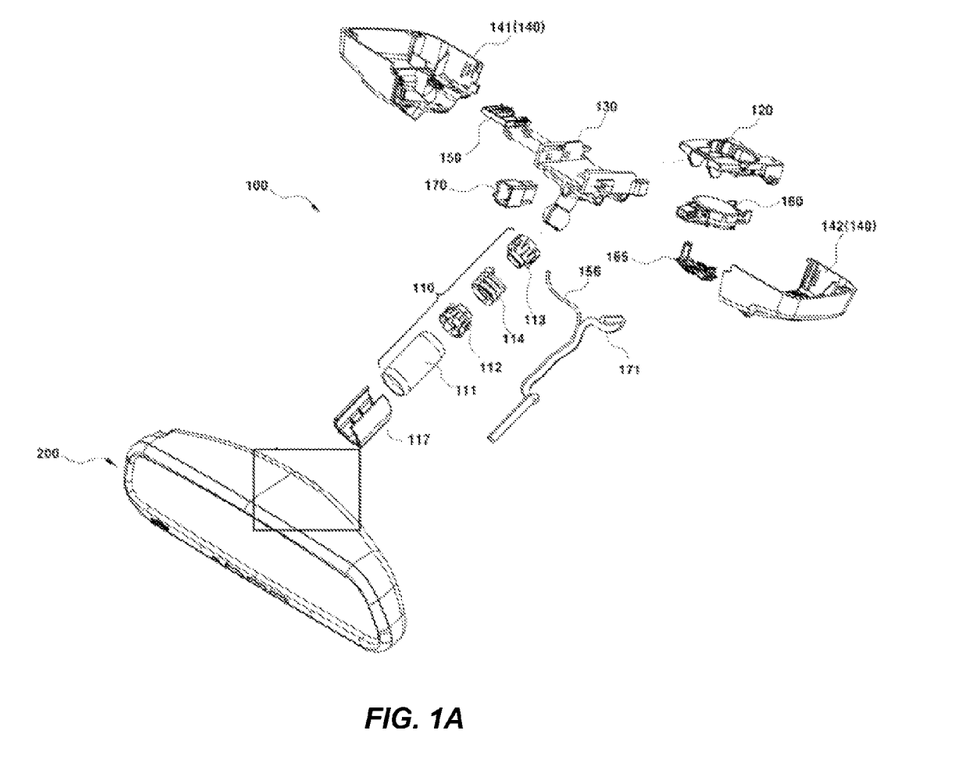
FIG. 1A and FIG. 1B are exploded perspectives view showing an exemplary integrated mirror assembly of a vehicle according to the present invention.
Figure 1B:
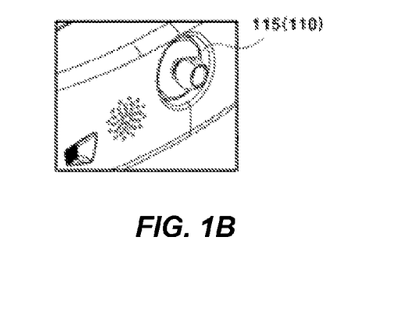

As can be seen in FIG. 1A, FIG. 1B and FIG. 6, the sub stay 110 includes a cylindrical sub body 111, a first joint support 112 inserted into and disposed at one end of the sub body 111, a second joint support 113 inserted into and disposed at an opposite end of the sub body 111, and a support spring 114 inserted into the center of the sub body 111 to resiliently support a portion between the first joint support 112 and the second joint support 113.

Then, the joint member 115 coupled to a rear surface of the inside mirror 200 is rotatably coupled to the first joint support 112, and the ball joint 131 of the mount 130 is rotatably coupled to the second joint support 113.

Figure 2A:
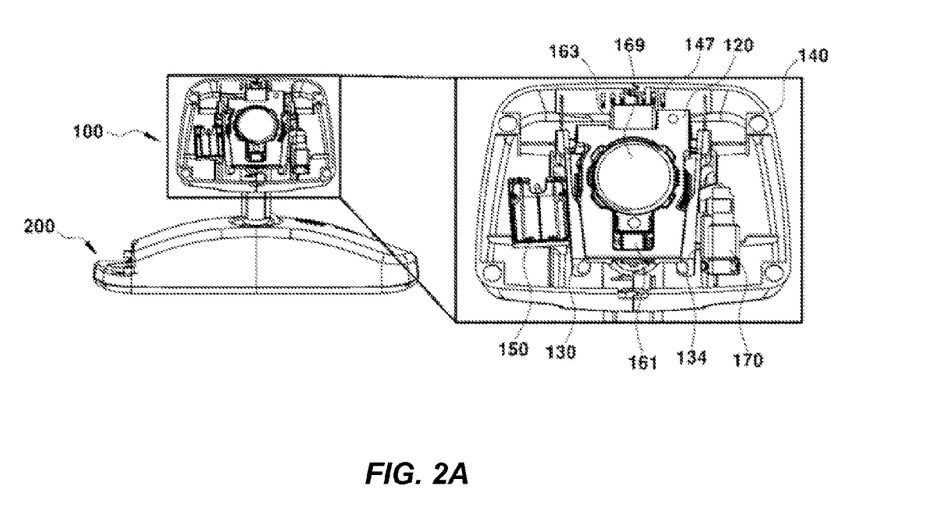
FIG. 2A, FIG. 2B and FIG. 2C are perspective views showing a coupled state of the exemplary integrated mirror assembly of a vehicle according to the present invention.
Figure 2B:
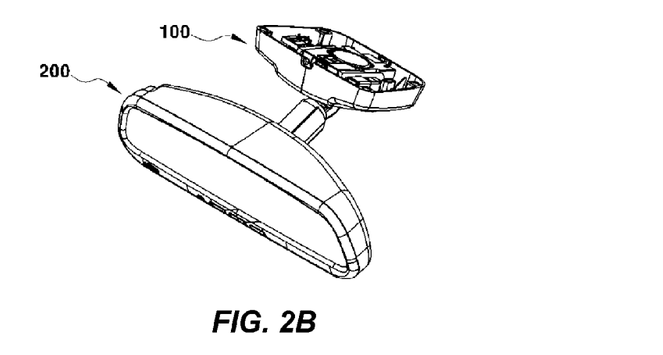
Figure 2C:
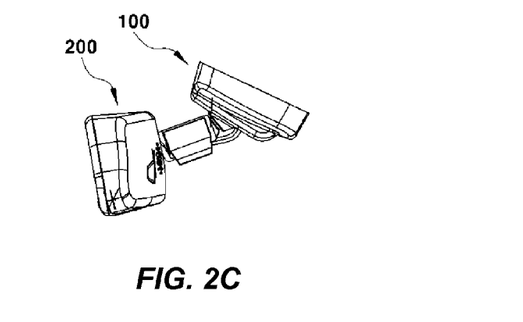
Figure 3A:
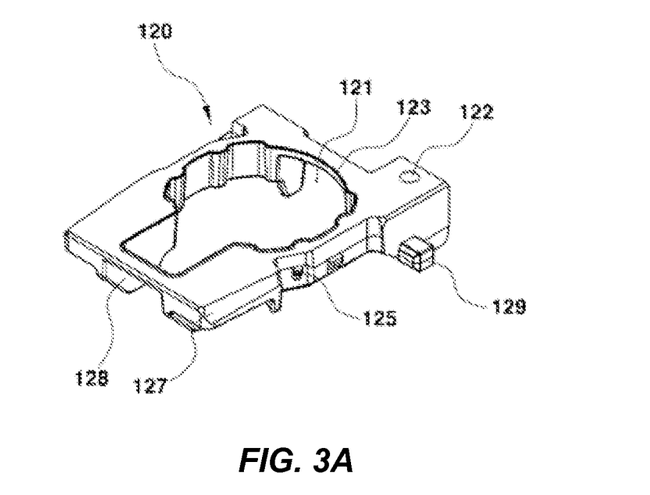
FIG. 3A, FIG. 3B, FIG. 3C and FIG. 3D are views showing a base and a rain sensor of the exemplary integrated inside mirror assembly according to the present invention.
Figure 3B:
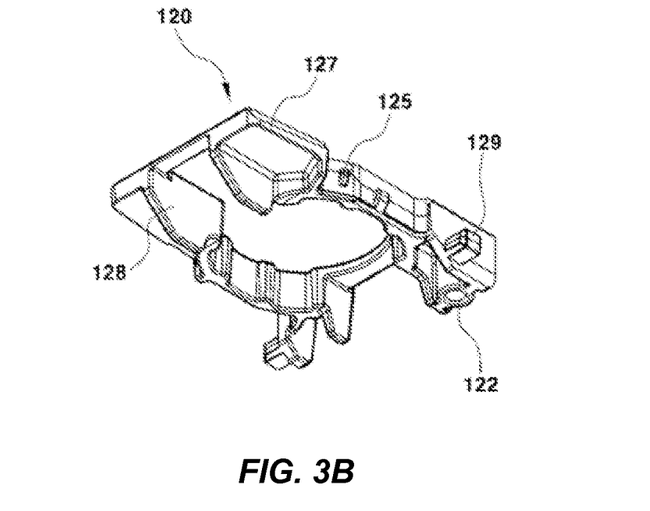
Figure 3C:
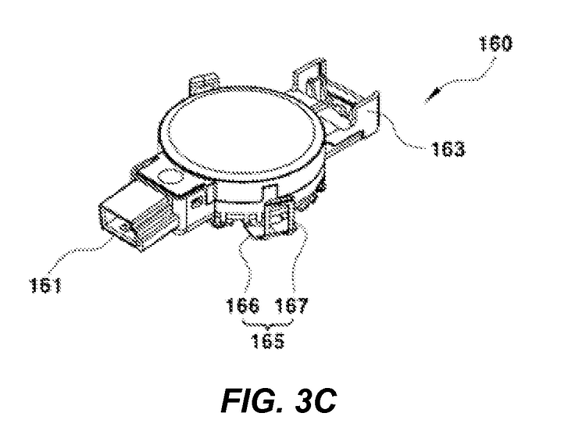
Figure 3D:
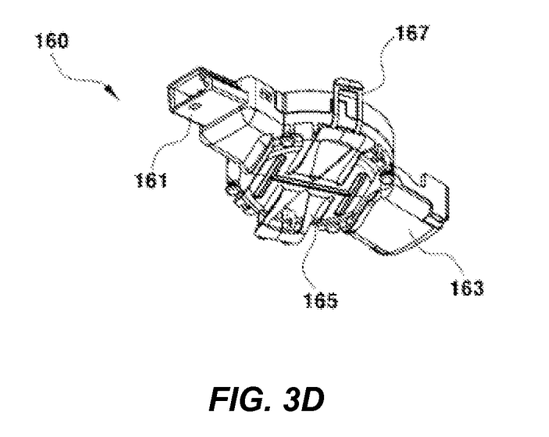
Figure 4A:
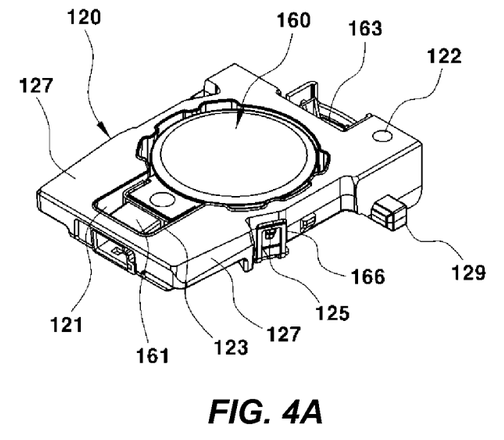
FIG. 4A and FIG. 4B are views showing an assembled state of the base and the rain sensor of the exemplary integrated inside mirror assembly according to the present invention.
Figure 4B:
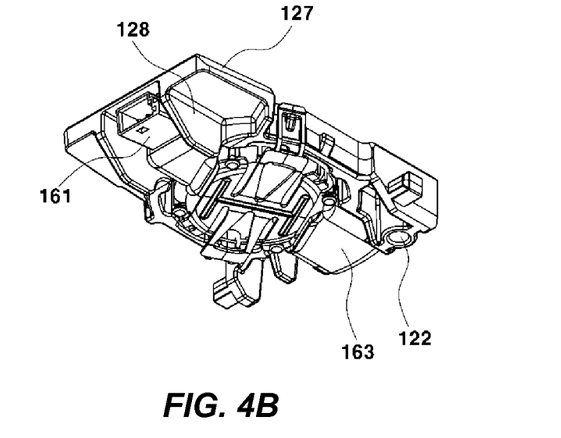

As can be seen in FIG. 2A, FIG. 2B and FIG. 2C, a wiring guide 117 is detachably assembled at an outside of the sub stay 110, and the wiring guide 117 attaches and supports the electric wire 171 of the inside mirror 200 and the signal wire 156 of the antenna member 155 such that the electric wire 171 of the inside mirror 200 and the signal wire 156 of the antenna member 155 are adjacent to the sub stay 110.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated inside mirror assembly for a vehicle having a stay fixed to a windshield glass of the vehicle and an inside mirror coupled to the stay, wherein the stay comprises:
    a sub stay coupled to a rear surface of the inside mirror;
    a base attached to an upper end of the windshield glass and to which a rain sensor is mounted;
    a mount slidably assembled at an outside of the base and coupled to the sub stay through a ball joint; a stay cover coupled to the mount while surrounding the mount and attached to the upper end of the windshield glass; and
    an antenna cover assembled at one side of the mount and to which an antenna member is mounted,
    wherein first position guides vertically protrude from a lower surface of a tip end of the base, for setting of an assembly position of the mount, and the first position guides form a predetermined distance between an upper surface of the mount and a lower surface of the base.

2. The integrated inside mirror assembly of claim 1, wherein the base includes a sensor hole into which the rain sensor is inserted, and a side coupling boss protrudes from a side surface for coupling of a spring clip supporting the rain sensor inserted into the sensor hole.

3. The integrated inside mirror assembly of claim 1, wherein mount guides corresponding to inclined surfaces are provided on opposite side surfaces of a tip end of the base to prevent separation of the slidably assembled mount, and base guides having inclined surfaces corresponding to the mount guides are formed in the mount.

4. The integrated inside mirror assembly of claim 1, wherein second position guides protrude outwards from opposite side surfaces of a rear end of the base, for setting of the assembly position of the mount, and the second position guides stop while contacting ends of guide rails formed at a rear end of the mount to determine a sliding assembly position of the mount.

5. The integrated inside mirror assembly of claim 1, wherein a first coupling hole is formed at one end of the base, for bolt coupling of the base to the mount, and the mount has a second hole overlapping the first coupling hole.

6. The integrated inside mirror assembly of claim 1, wherein a plurality of holders are formed on opposite side surfaces of the mount, for coupling to the stay cover, the stay cover has a first cover at one of left and right sides thereof and a second cover at the other of the left and right sides thereof such that a plurality of coupling parts inserted into the holders protrude from an inside of the stay cover.

7. The integrated inside mirror assembly of claim 1, wherein the mount has a connector bracket on one of left and right side surfaces thereof, and a connector for electrical connection of the inside mirror is assembled in the connector bracket.

8. The integrated inside mirror assembly of claim 1, wherein the mount includes a first wire support for supporting an electric wire of the inside mirror and a second wire support for supporting a signal wire of the antenna member on a lower surface thereof.

9. The integrated inside mirror assembly of claim 1, wherein the antenna member is an electronic toll collection system (ETCS) antenna for an ETCS.

10. The integrated inside mirror assembly of claim 1, wherein the stay cover includes a first cover at one of left and right sides thereof and a second cover at the other of the left and right sides thereof, which are coupled to each other, wherein a joint through-hole through which the ball joint of the mount passes is formed at a portion of the stay cover where the first cover and the second cover are jointed to each other, and a wiring hole through which the electric wire of the inside mirror and the signal wire of the antenna member passes is formed on a rear side of the joint through-hole.

11. The integrated inside mirror assembly of claim 1, wherein a seam prevention pad to which the windshield glass is adhered is attached to a periphery of the stay cover.

12. The integrated inside mirror assembly of claim 1, wherein the rain sensor is a defog sensor embedded rain sensor having a defog sensor at one side thereof, and the stay cover has an air circulation hole for introducing and discharging air for an operation of the defog sensor.

* * * * *